Jan. 19, 1937. W. A. DICKIE ET AL 2,067,905
PRODUCTION AND TREATMENT OF ARTIFICIAL
FILAMENTS, THREADS, FOILS AND THE LIKE
Filed Sept. 19, 1933
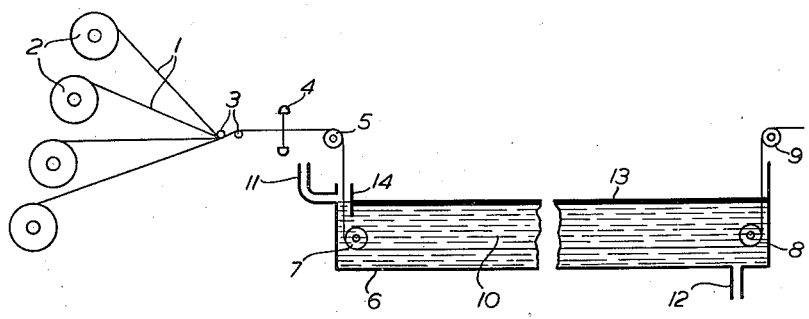
INVENTORS
W.A. DICKIE
R.W. MONCRIEFF
C.W. NORTH
by
ATTORNEYS Patented Jan. 19, 1937

2,067,905

UNITED STATES PATENT OFFICE 2,067,905

PRODUCTION AND TREATMENT OF ARTIFICIAL FILAMENTS, THREADS, FOILS, AND THE LIKE

William Alexander Dickie, Robert Wighton Moncrieff, and Charles William North, Spondon, near Derby, England, assignors to Celanese Corporation of America, a corporation of Delaware Application September 19, 1933, Serial No. 690,122
In Great Britain October 28, 1932

6 Claims. (Cl. 8—20)

This invention relates to improvements in the manufacture of textile and other materials, and particularly to processes in which the materials are subjected to treatments with liquids in open vessels.

In the production or treatment of textile materials, e. g. artificial filaments and threads, and of films and the like, it is frequently necessary to treat the materials in vessels containing liquid reagents, and it is in many cases more convenient or desirable that such vessel should be open to the atmosphere or should not at any rate be entirely enclosed. Thus in the wet spinning of artificial filaments and the like, the dope is extruded into vessels containing a suitable coagulating solution, as is described for example in U. S. Patents Nos. 1,465,994 and 1,467,493 and U. S. applications S. Nos. 402,785 filed 26th October, 1929 and 418,414 filed 3rd January, 1930. Again, in the stretching of artificial materials, as is described for example in U. S. applications S. Nos. 378,684 filed 16th July, 1929, 403,140 filed 28th October, 1929, 573,424 filed 6th November, 1931 and 602,844 filed 2nd April, 1932, and in processes for the shrinkage of such materials as described in U. S. applications S. Nos. 611,240 filed 13th May, 1932 and 607,667 filed 26th April, 1932, the processes may be effected by passing the materials through vessels containing suitable reagents. Saponification is another example of a treatment in which a bath may be employed. In all these processes it is very desirable that the percentage composition of the treatment baths shall remain as far as possible constant, in order that materials having a uniform nature may be obtained. When, however, open vessels, which have considerable advantages for many purposes, are employed, the different vapour pressures of the constituents and the difference in the variation of such vapour pressures with temperature, may lead to appreciable changes in the composition of the bath during its use, and such alterations may have highly undesirable effects upon the uniformity of the properties of the materials obtained.

It has now been discovered that the maintenance of the composition of a treatment bath in a constant state may be greatly assisted by covering the surface of the bath with a suitable liquid, and according to the present invention therefore the liquid baths used in the manufacture of textile and other materials, and particularly in the stretching and similar treatment of materials containing organic derivatives of cellulose, are covered with a layer of a liquid which is substantially immiscible with the treatment bath. Such a liquid must of course have a lower specific gravity than the liquid medium forming the treatment bath, and preferably it is also substantially non-volatile. Further, if it comes into contact with the materials to be treated, it should have no deleterious action upon them.

The invention is of course of particular importance in processes wherein baths containing volatile constituents are employed, and especially when the volatile constituent is the active agent in the bath.

We have found that oils and particularly high grade mineral oils such as paraffin oil are very suitable for this purpose, particularly in the case of aqueous treatment baths. Any suitable thickness of the layer of oil may be employed, for example 1/20, 1/8 or 1/4 inch or more.

Other liquids or mixtures of liquids, or liquids containing dissolved solid constituents, may of course be employed, particularly where it is desired that the coating should itself have some action upon the materials, and not merely prevent evaporation. Thus if it is desired to remove a size or dressing from filaments or the like before treatment in the bath the coating liquid may consist of or contain a suitable reagent, and the materials may be caused to enter the bath through this coating and may or may not be withdrawn through it.

While, as indicated above, the materials may, if desired, contact with the oil or other coating on the bath, it is not necessary that they should do so, and in fact it is in general preferable that contact should be avoided. However, especially in the case of the treatment of formed materials, with which the present invention is particularly concerned, for example in the stretching or shrinking of threads containing organic derivatives of cellulose, it may be advantageous for the materials on issuing from the bath to contact with the oil or other coating. In this manner the threads or other materials may, for example, be lubricated.

When rollers or other devices are employed which rotate in the bath, it is desirable that the liquid surface in their vicinity should be maintained free from oil or other coating layer, as otherwise they may tend to break up the surface coating and emulsify it in the bath. If the rollers are positioned some distance below the coating, such a precaution may be unnecessary, but if they are only partially immersed in the bath, or if their upper surface is close to the lower surface of the oil or other liquid, it is desirable, as stated above, to keep the surface of the treatment liquid in the vicinity of the rollers or other devices free from the oil or other coating. This may be effected, for example, by means of partitions which extend below the surface of the coating for a suitable distance. Such partitions may be made to fit into grooves in the sides of the bath so that they may be removed, if necessary, during the process of threading up or similar operation.

Moreover, when the liquid in the bath is circulated it should be withdrawn from a sump in order to avoid the risk of withdrawing the coating layer also and emulsifying it with the bath. The treatment liquid should also, of course, be introduced in a suitable manner so that it does not disturb the coating layer, and if a considerable liquid flow is maintained it may be desirable to have suitable baffles, for example, in the form of partitions across the bath, extending below the lower surface of the coating, in order to prevent the coating liquid from being piled up at the end of the bath towards which the treatment liquid flows.

The process of the invention is particularly valuable in connection with shrinking, stretching and saponifying operations in baths comprising relatively volatile liquids, for example ammonia, alcohol, acetic acid, acetone, dioxane, methylene ethylene ether, methylene chloride, benzene and the like, but as has been stated above, it may also be employed in connection with any other process in which materials are subjected to a bath treatment.

The process of the present invention is applicable to the treatment of natural or artificial textile materials and other products broadly, e. g. natural and artificial materials having a basis of cellulose, but it is particularly valuable in the manufacture of artificial filaments, threads, yarns, films and the like containing cellulose acetate or other organic derivatives of cellulose, for example cellulose formate, propionate, butyrate, nitroacetate and other esters or mixed esters of cellulose, ethyl, butyl, benzyl or other cellulose ethers or mixed ethers, and mixed ether-esters, for example ethyl cellulose acetate and oxy-ethyl cellulose acetate.

A suitable apparatus for effecting the softening and stretching of a plurality of yarns in warp formation in accordance with this invention is illustrated in the accompanying drawing which, however, is not to be regarded as in any way limiting the invention.

Referring to the drawing a plurality of yarns 1 are drawn from a creel of bobbins 2, passed over guides 3 and drawn through a reed 4 so that they are brought into warp formation. The yarns are then led in this formation over a guide roller 5 into a bath 6 and round a feed roller 7 immersed in the bath 6. After traversing the length of the bath 6 the yarns 1 are led round a draw roller 8 immersed in the bath 6 and thence out of the bath over a guide roller 9 to suitable washing, drying and winding apparatus.

The bath 6 contains a softening liquid 10 containing a volatile constituent and is provided with a feed pipe 11 and a withdrawal pipe 12 for such liquid. On the surface of the liquid 10 is floated an immiscible liquid 13 serving to prevent evaporation of the volatile constituent contained in the liquid 10. Near to the end of the bath 6 at which the yarns enter, a partition 14 is provided which extends across the entire width of the bath and prevents the immiscible liquid 13 from contacting with the yarns as they enter the bath. The yarns are arranged to enter the bath as near as may be convenient to the end thereof and the partition 14 is arranged to be as near as convenient to the yarn entering the bath. In this way the proportion of the surface of the liquid 10 which is not covered by the immiscible liquid 13 is made small so that the immiscible liquid 13 substantially covers the liquid 10.

The draw roller 8 is rotated at a speed greater than the feed roller 7 so that the yarns are stretched between such rollers.

The following examples are given in order to illustrate the invention, and are not to be regarded as in any way limiting it:—

Example 1

A number of cellulose acetate threads are drawn from a creel of bobbins and led in warp formation under a feed roller immersed in a stretching bath consisting of a 48–50% aqueous solution of dioxane contained in an open vessel. The length of the bath is about 100 feet, and at the further end the threads are contacted with a draw roller rotating at a suitable peripheral speed so that they are stretched to 400–500% of their original length. They are then washed, dried and wound. The bath is covered with a coating of paraffin about ⅛ inch deep to prevent evaporation. A partition extending across the bath on the side of the feed roller opposite to that at which the threads enter the bath maintains the surface of the softening liquid in the vicinity of the feed roller free from paraffin and so prevents the paraffin from contacting with the threads before their entry into the bath.

Example 2

A warp of cellulose acetate threads is passed from a creel of bobbins into an open saponifying bath consisting of aqueous ammonia, the surface of which is covered with a ¼ inch layer of medium paraffin to prevent evaporation. The threads are withdrawn from the bath without contacting with the paraffin and are washed, dried and wound.

What we claim and desire to secure by Letters Patent is:—

1. In a process for the production of artificial filaments, yarns, threads and like textile materials, the steps of continuously treating said artificial materials in a bath containing a volatile constituent, maintaining the surface of said bath substantially covered with a layer of liquid substantially immiscible therewith and of low volatility, and drawing the said materials continuously through the bath in such a way that they do not come into contact with said surface layer of liquid on entering the bath.

2. In a process for the production of artificial filaments, yarns, threads and like textile materials having a basis of organic derivative of cellulose, the steps of continuously treating said artificial materials in a bath containing a volatile constituent, maintaining the surface of said bath substantially covered with a layer of liquid substantially immiscible therewith and of low volatility, and drawing the said materials continuously through the bath without contact with the said surface layer of liquid.

3. In a process for the production of artificial filaments, yarns, threads and like textile materials having a basis of organic derivative of cellulose, the steps of continuously softening said artificial materials in a bath containing a volatile constituent, maintaining the surface of said bath substantially covered with a layer of liquid substantially immiscible therewith and of low volatility, and drawing the materials continuously through the bath without contact with the said surface layer of liquid.

4. In a process for the production of artificial filaments, yarns, threads and like textile materials having a basis of cellulose acetate, the steps of continuously saponifying said artificial materials in a bath containing a volatile constituent, maintaining the surface of said bath substantially covered with a layer of a liquid substantially immiscible therewith and of low volatility, and drawing the materials continuously through the bath without contact with the said surface layer of liquid.

5. In a process for the production of artificial filaments, yarns, threads and like textile materials having a basis of cellulose acetate, the steps of continuously softening said artificial materials in a bath containing a volatile constituent and stretching the same while in contact with said bath, maintaining the surface of said bath substantially covered with a layer of a liquid substantially immiscible therewith and of low volatility, and drawing the materials continuously through the bath without contact with the said surface layer of liquid and at such a speed as to produce the desired stretch.

6. In a process for the production of artificial filaments, yarns, threads and like textile materials having a basis of cellulose acetate, the steps of continuously softening said artificial materials in a bath containing a volatile constituent while allowing the same to shrink, maintaining the surface of such bath substantially covered with a layer of a liquid substantially immiscible therewith and of low volatility, and drawing the materials continuously through the bath without contact with the said surface layer of liquid and at such a speed that the desired shrinkage takes place.

WILLIAM ALEXANDER DICKIE.
ROBERT WIGHTON MONCRIEFF.
CHARLES WILLIAM NORTH.